United States Patent
Varma et al.

(10) Patent No.: US 9,842,082 B2
(45) Date of Patent: Dec. 12, 2017

(54) DYNAMICALLY UPDATING LOGICAL IDENTIFIERS OF CORES OF A PROCESSOR

(71) Applicant: Intel Corporation, Santa Clara, CA (US)

(72) Inventors: Ankush Varma, Hillsboro, OR (US); Krishnakanth V. Sistla, Beaverton, OR (US); Guy G. Sotomayor, San Jose, CA (US); Andrew D. Henroid, Portland, OR (US); Robert E. Gough, Sherwood, OR (US); Tod F. Schiff, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 14/633,455

(22) Filed: Feb. 27, 2015

(65) Prior Publication Data

US 2016/0252943 A1    Sep. 1, 2016

(51) Int. Cl.
| | |
|---|---|
| *G06F 1/26* | (2006.01) |
| *G06F 1/00* | (2006.01) |
| *G06F 1/32* | (2006.01) |
| *G06F 15/00* | (2006.01) |
| *G06F 1/20* | (2006.01) |

(Continued)

(52) U.S. Cl.
CPC ............. *G06F 15/00* (2013.01); *G06F 1/206* (2013.01); *G06F 1/3243* (2013.01); *G06F 9/45541* (2013.01); *G06F 9/45558* (2013.01); *G06F 9/5077* (2013.01); *G06F 1/26* (2013.01); *G06F 2009/4557* (2013.01); *Y02B 60/1239* (2013.01); *Y02B 60/1275* (2013.01)

(58) Field of Classification Search
CPC .................................... G06F 1/26; G06F 1/32
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Phil Nguyen
(74) *Attorney, Agent, or Firm* — Trop, Pruner & Hu, P.C.

(57) ABSTRACT

In one embodiment, a processor includes a plurality of cores each including a first storage to store a physical identifier for the core and a second storage to store a logical identifier associated with the core; a plurality of thermal sensors to measure a temperature at a corresponding location of the processor; and a power controller including a dynamic core identifier logic to dynamically remap a first logical identifier associated with a first core to associate the first logical identifier with a second core, based at least in part on a temperature associated with the first core, the dynamic remapping to cause a first thread to be migrated from the first core to the second core transparently to an operating system. Other embodiments are described and claimed.

13 Claims, 18 Drawing Sheets

(51) Int. Cl.
*G06F 9/455* (2006.01)
*G06F 9/50* (2006.01)

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 8,688,883 B2 | 4/2014 | Guddeti et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0166075 A1* | 7/2005 | Hack ............... G06F 1/206 713/320 |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0216229 A1* | 9/2007 | Johnson ............... G06F 1/30 307/86 |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0120515 A1* | 5/2008 | Ritz ............... G06F 9/5077 713/601 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0288092 A1* | 11/2009 | Yamaoka ............. G06F 9/5033 718/104 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0088041 A1* | 4/2011 | Alameldeen ............ G06F 9/505 718/105 |
| 2011/0154090 A1 | 6/2011 | Dixon et al. |
| 2012/0079290 A1 | 3/2012 | Kumar |
| 2012/0246506 A1 | 9/2012 | Knight |
| 2012/0266179 A1* | 10/2012 | Osborn ................ G06F 9/5077 718/105 |
| 2013/0061064 A1 | 3/2013 | Ananthakrishnan et al. |
| 2013/0067132 A1* | 3/2013 | Guddeti ................ G06F 13/24 710/260 |
| 2013/0079946 A1* | 3/2013 | Anderson ............ G06F 1/3228 700/299 |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0111386 A1* | 5/2013 | Rhodes ................ G06F 9/5077 715/771 |
| 2013/0346774 A1 | 12/2013 | Bhandaru et al. |
| 2014/0068290 A1 | 3/2014 | Bhandaru et al. |
| 2014/0115223 A1 | 4/2014 | Guddeti et al. |
| 2014/0195829 A1 | 7/2014 | Bhandaru et al. |
| 2014/0208141 A1 | 7/2014 | Bhandaru et al. |
| 2015/0169382 A1* | 6/2015 | Anderson ............ G06F 9/5094 718/104 |

OTHER PUBLICATIONS

Spec-Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

\* cited by examiner

DYNAMICALLY UPDATING LOGICAL IDENTIFIERS OF CORES OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

As a result of manufacturing variations, each core of a multicore processor may have slightly different power/performance characteristics. Such variation is typically hidden from a system by presenting all cores with the same capabilities by identifying processor operating parameters based on the slowest or worst performing core of the processor (e.g., as determined by manufacturing or characterization testing). Such processor configuration results in lost opportunities in terms of performance, power savings, thermals and reliability, as well as the inability to make engineering trade-offs between these four vectors.

DETAILED DESCRIPTION

Figure 1:
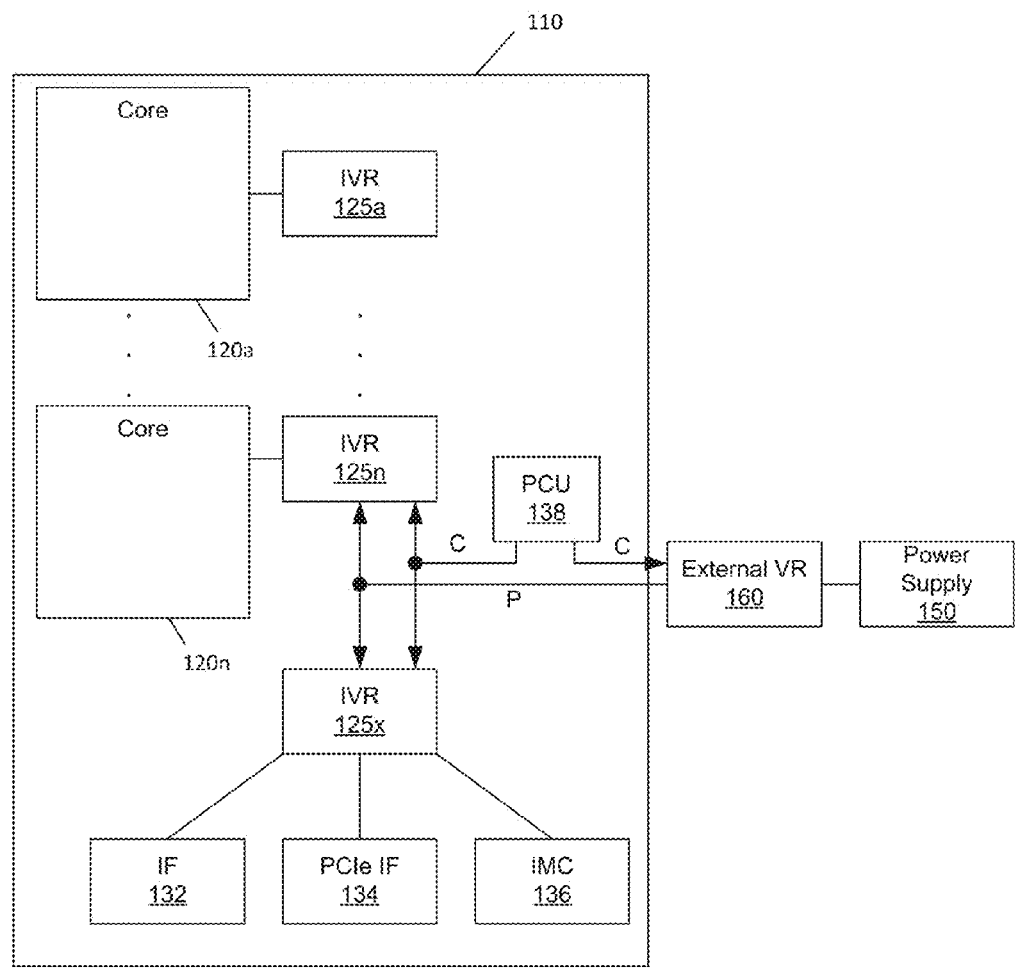
FIG. 1 is a block diagram of a portion of a system in accordance with an embodiment of the present invention.

In various embodiments, a processor may include a controller to enable operating system (OS)-transparent migration of workloads between cores or other functional units. In such migration, one or more threads (from the OS point of view) being executed on a first core are moved to be executed on a physically different core. Such migration may be performed by processor hardware/firmware control in an OS-transparent manner. By providing migration as described herein, various power, performance, thermal and reliability opportunities can be exploited.

While different mechanisms to effect thread migration between cores may be used, in one embodiment a logical identifier (ID) (which is an OS-visible value) may be used to dynamically migrate threads between cores. In one example, each core is provided a logical (OS-visible) core ID that may be different from its actual (physical and static) core ID, which is not OS visible. In an embodiment, dynamic core identifier logic of a processor may be used to manage the mapping from logical to physical core IDs. This logic may further be used to remap logical cores to different physical cores dynamically, which in turn enables migration of running thread(s) from one physical core to another. As described herein, in some cases this dynamic remapping and thread migration may be performed based at least in part on power, performance, temperature and/or other telemetry data.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In some embodiments, PCU 138 may include a logic to perform dynamic remapping of logical core identifiers, as described herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
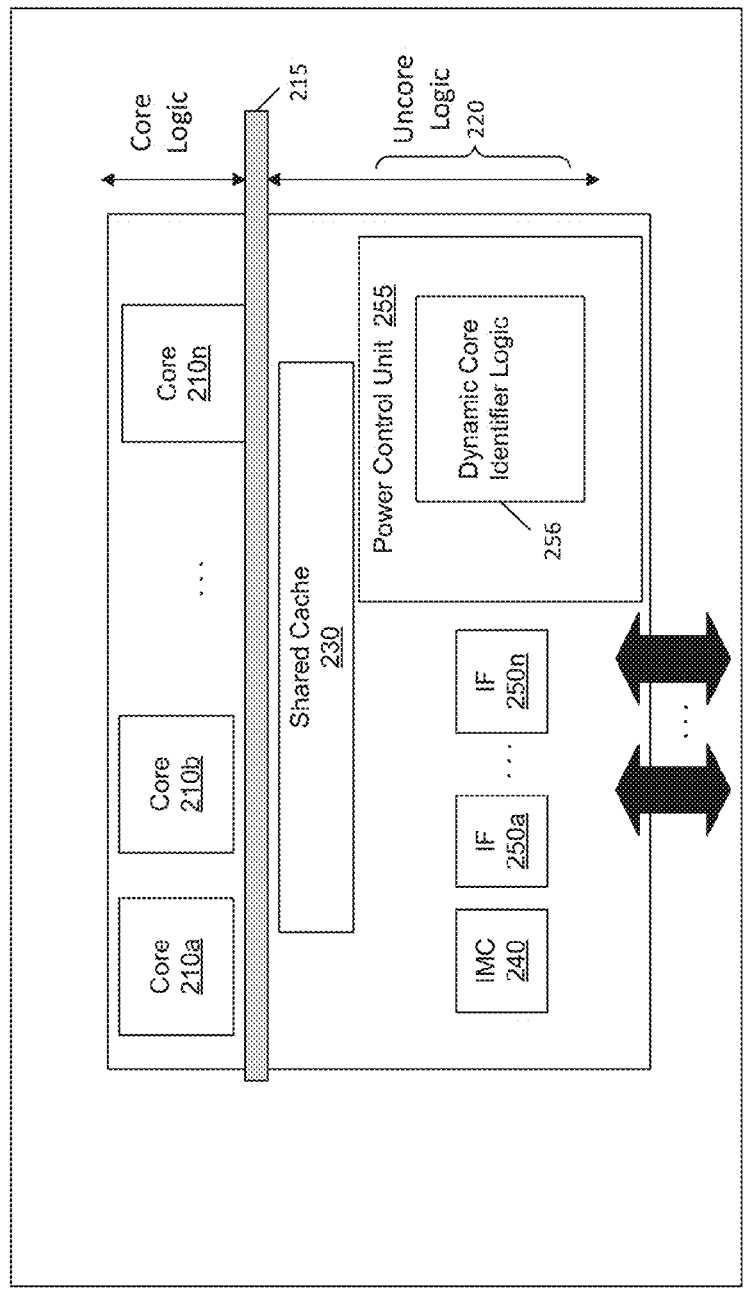
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. As shown, power control unit 255 includes a dynamic core identifier logic 256, which may be used to dynamically remap logical identifiers between different cores, to enable migration of executing threads between cores based on a variety of conditions, including for performance and/or power management reasons.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
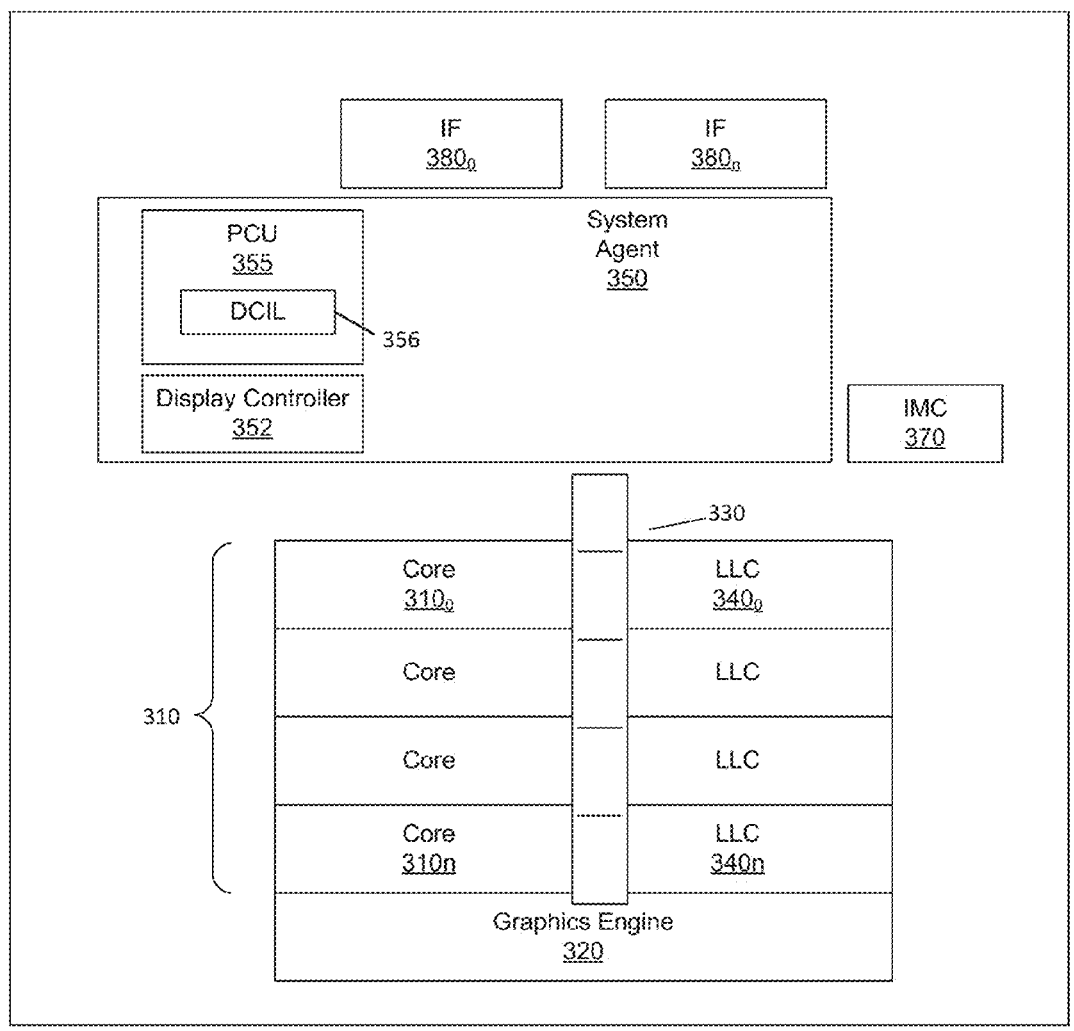
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In an embodiment, power control unit 355 includes a dynamic core identifier logic 356 to perform dynamic remapping of logical identifiers between various cores to leverage capabilities of different cores based, at least in part on workload, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
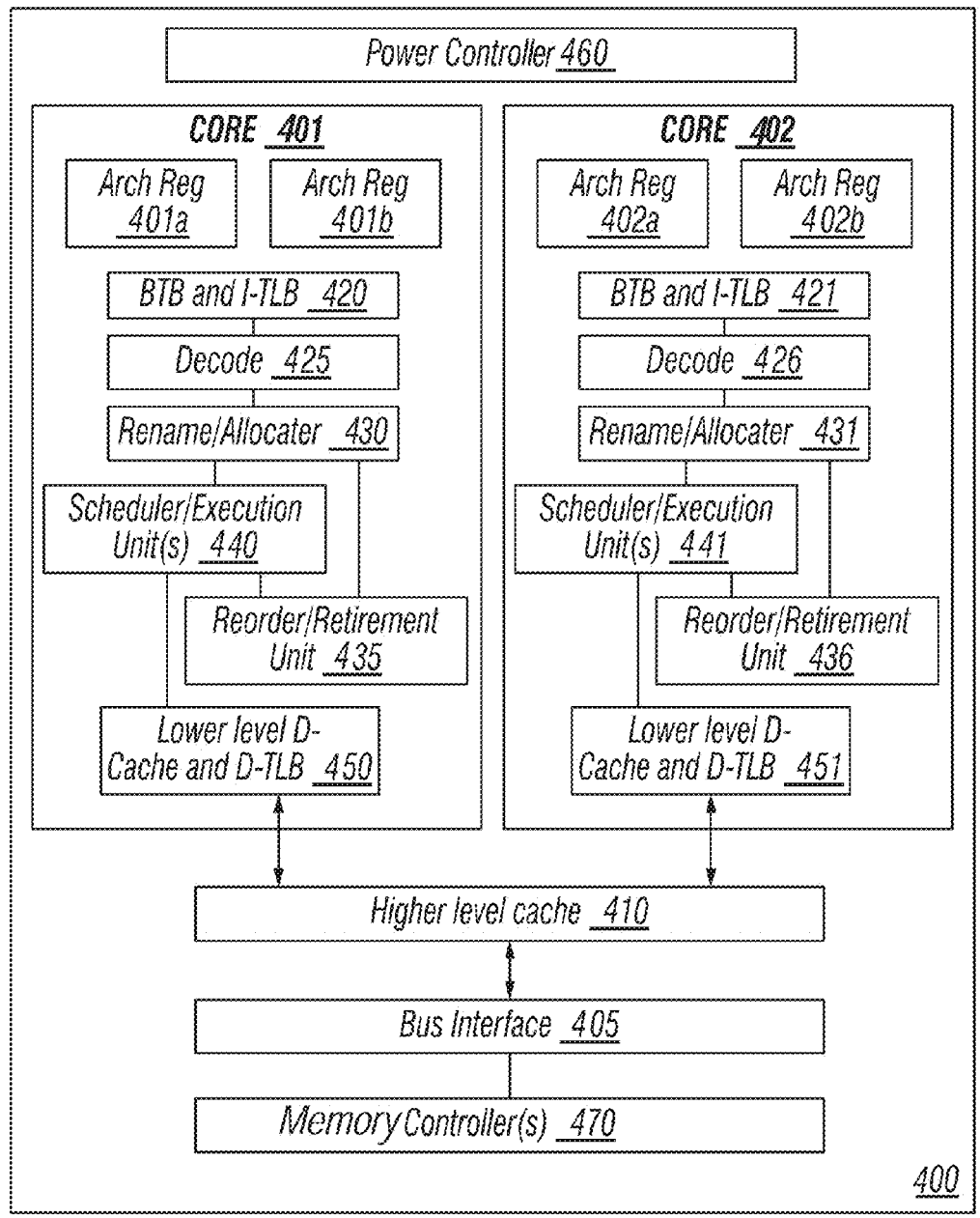
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
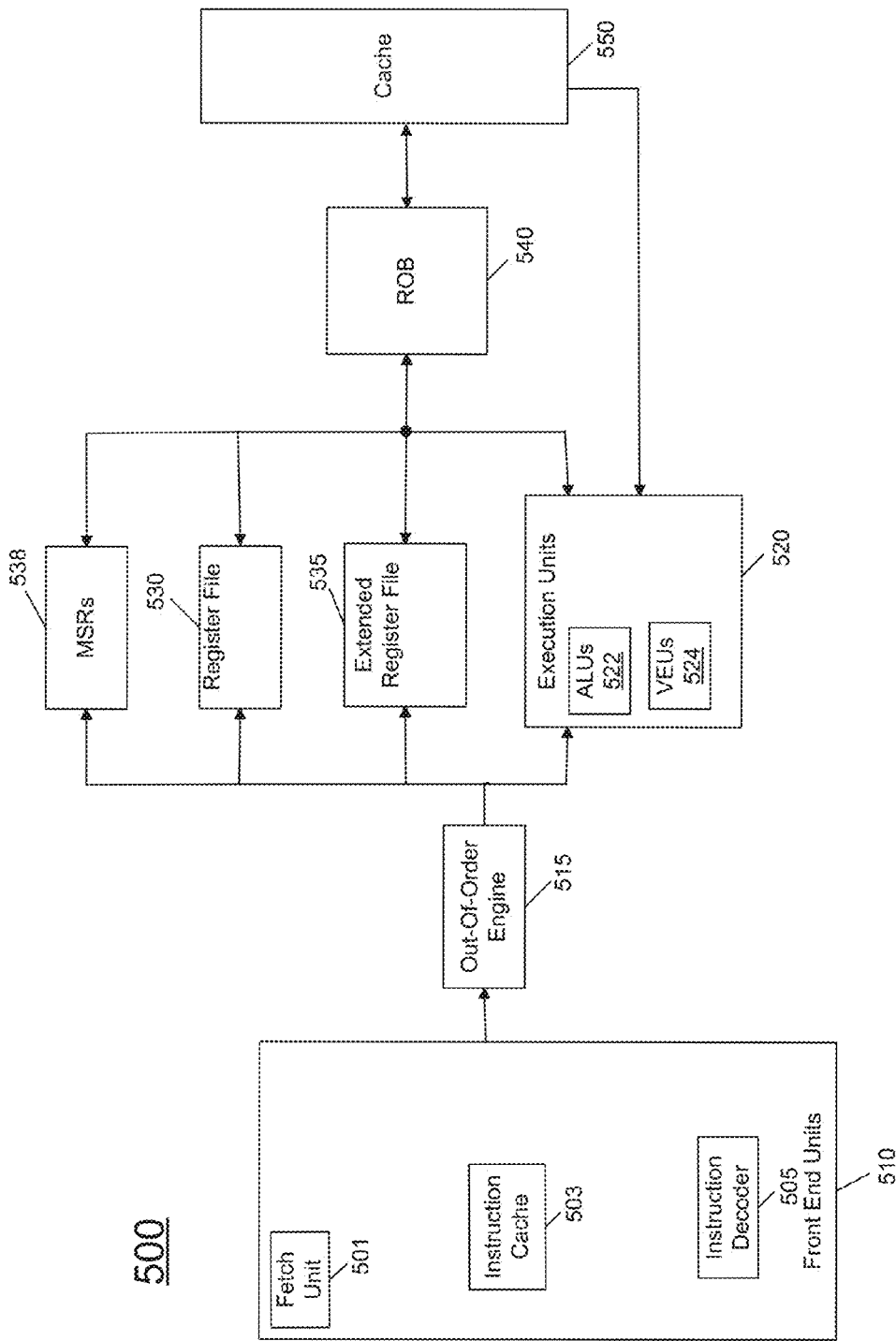
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
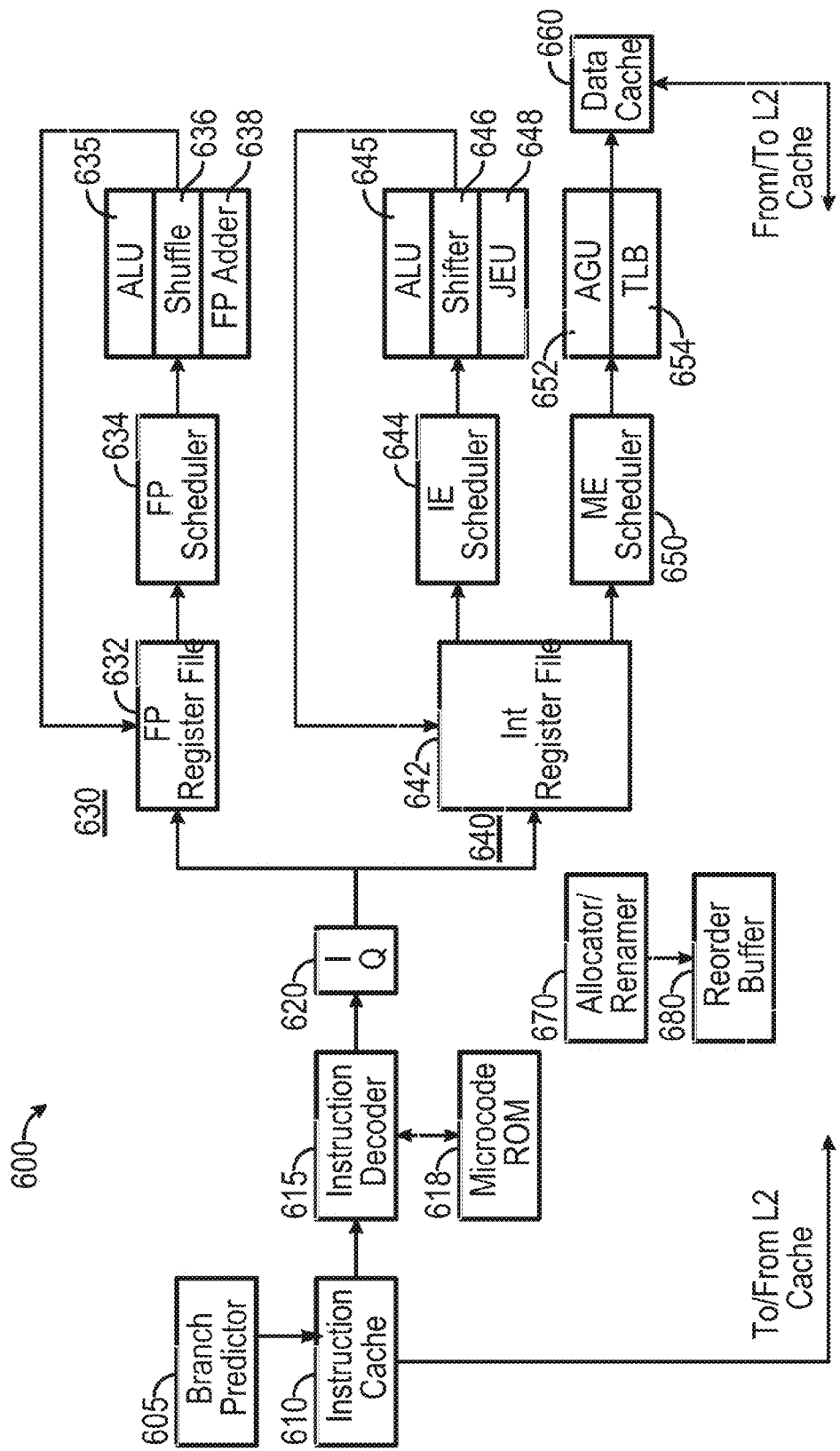
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
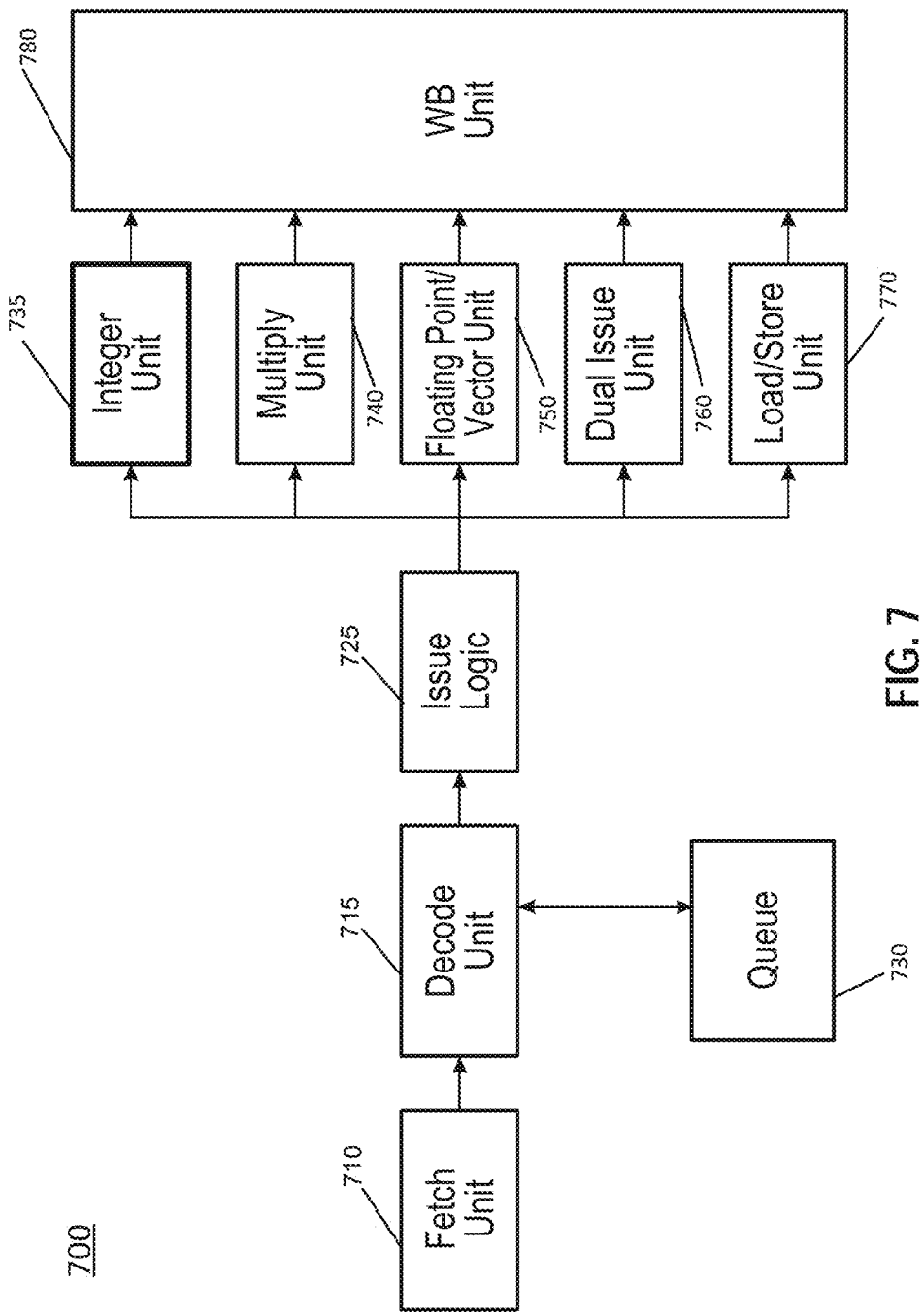
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
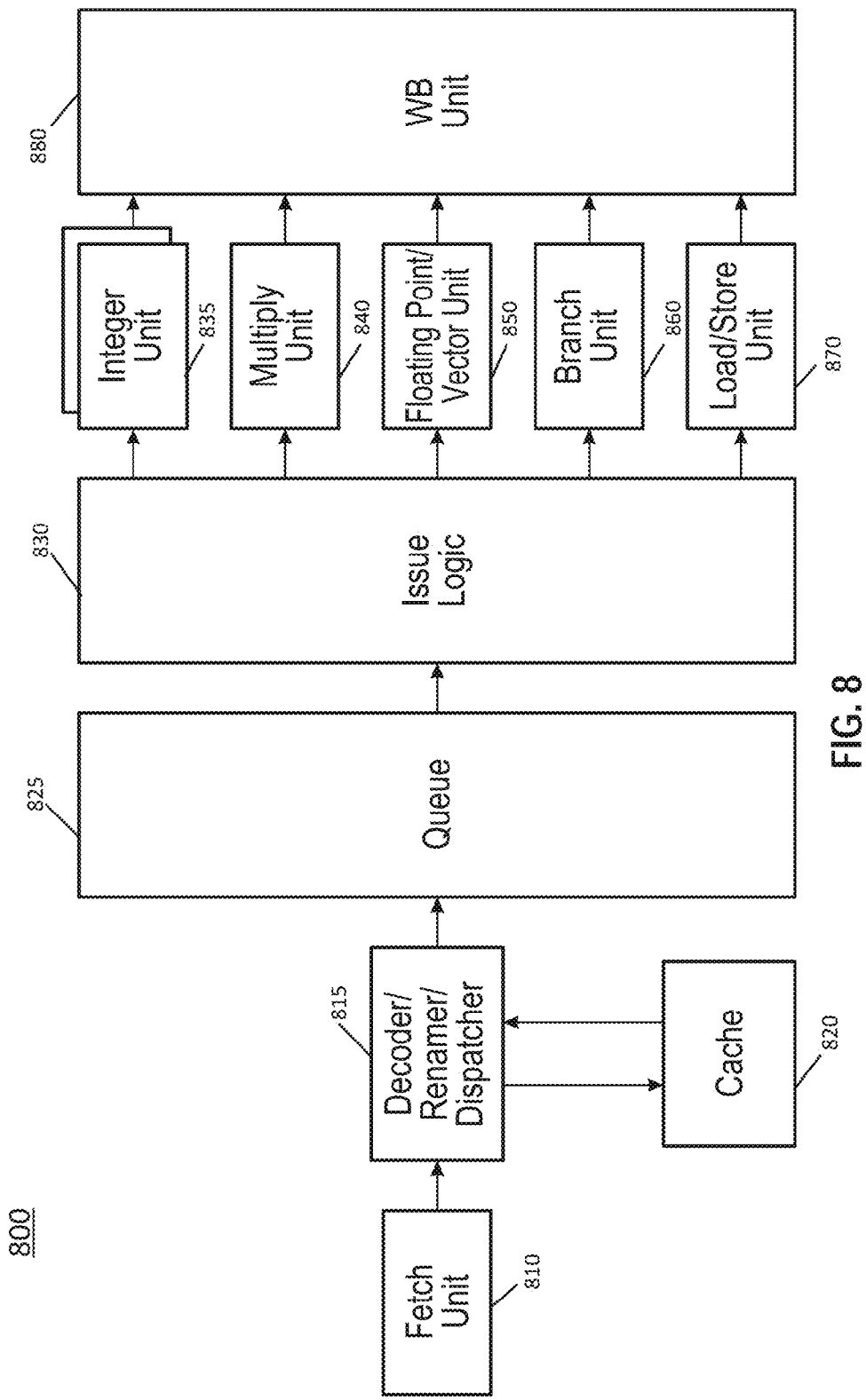
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
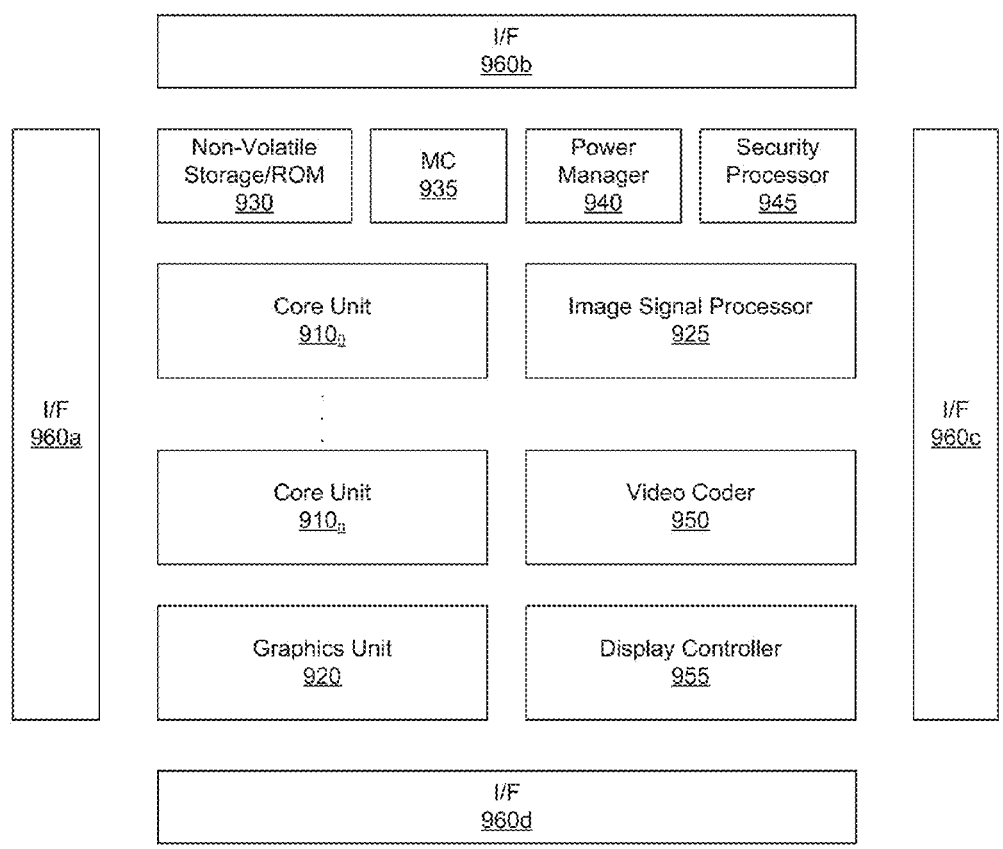
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including the dynamic core logical identifier remapping.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
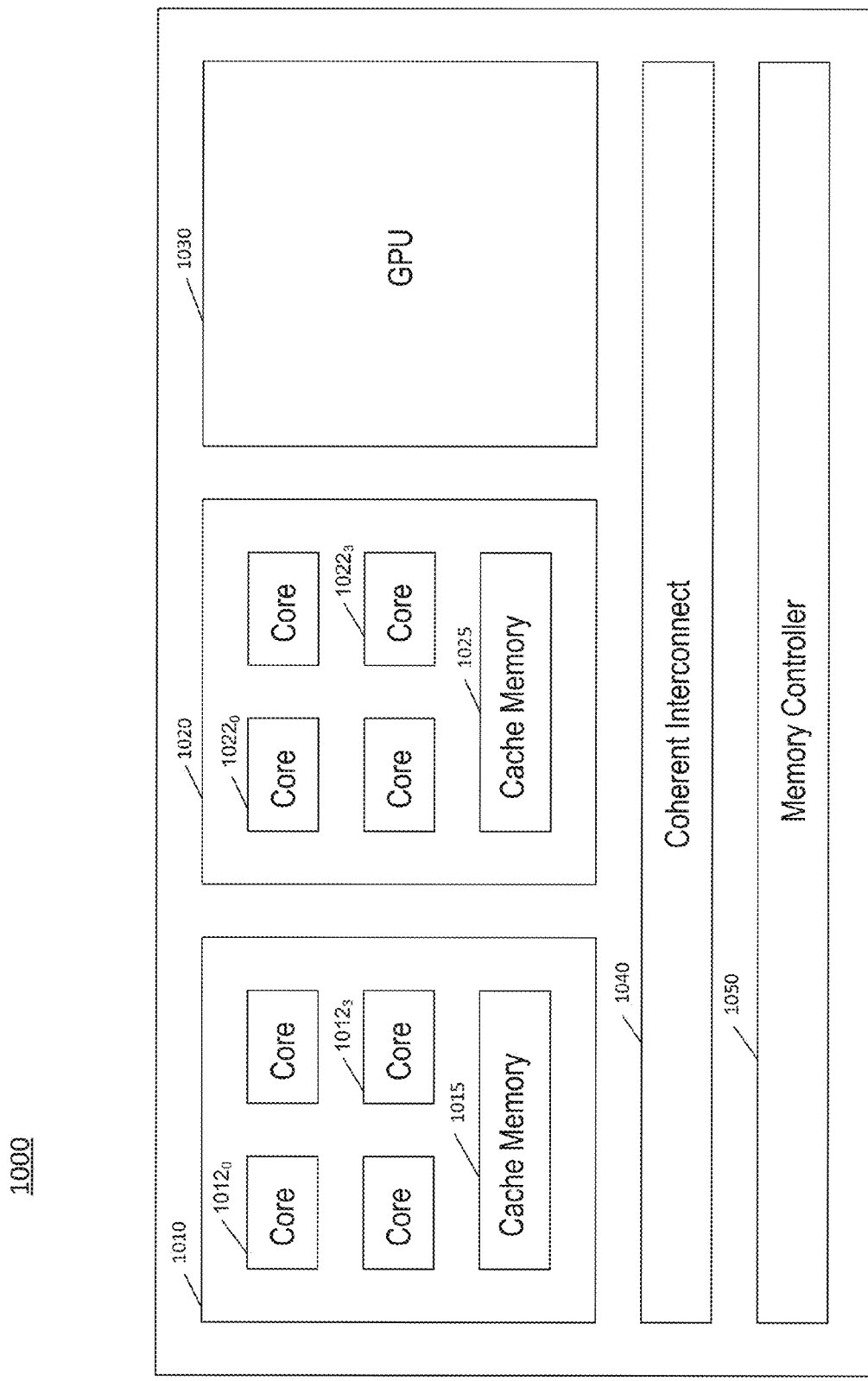
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
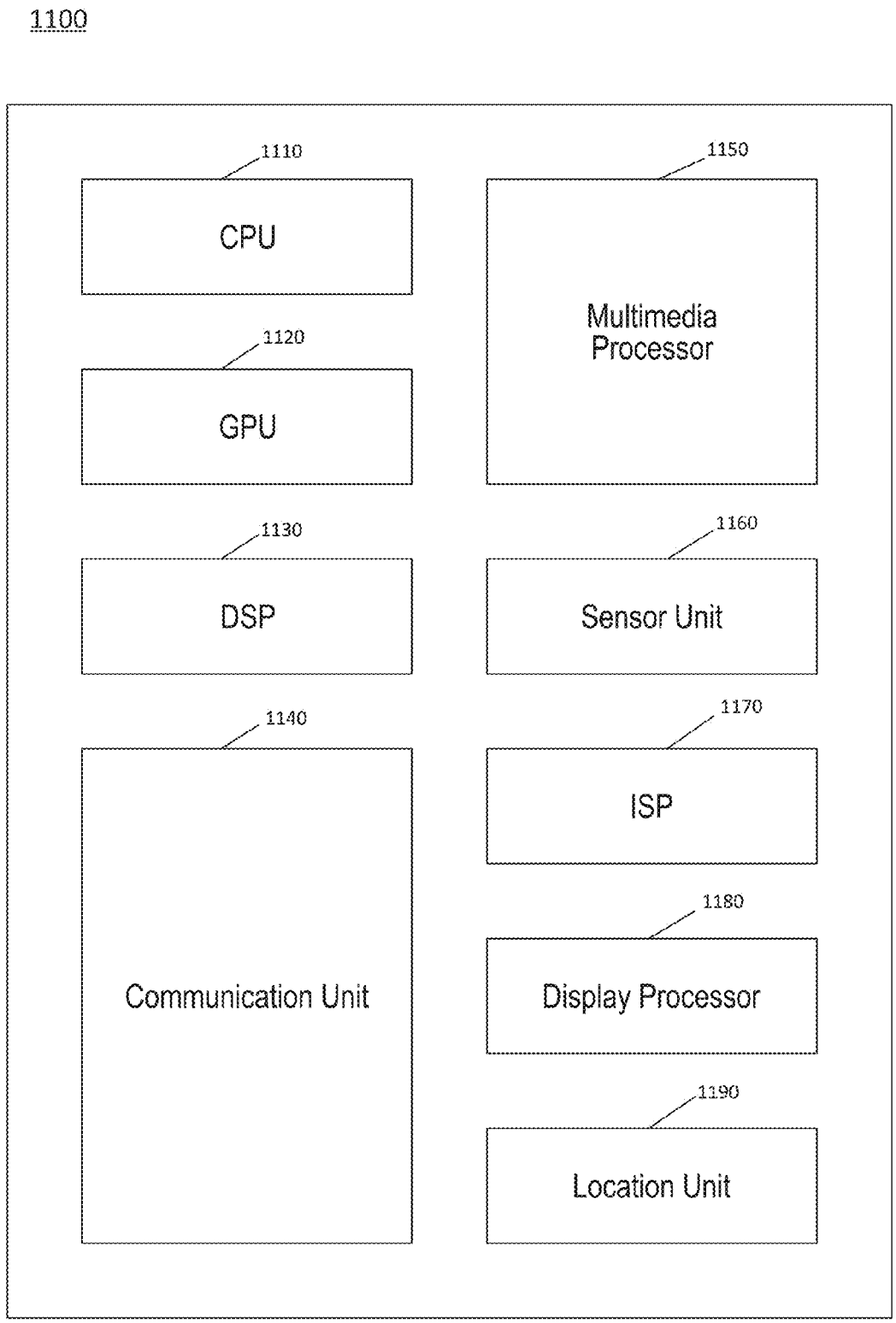
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
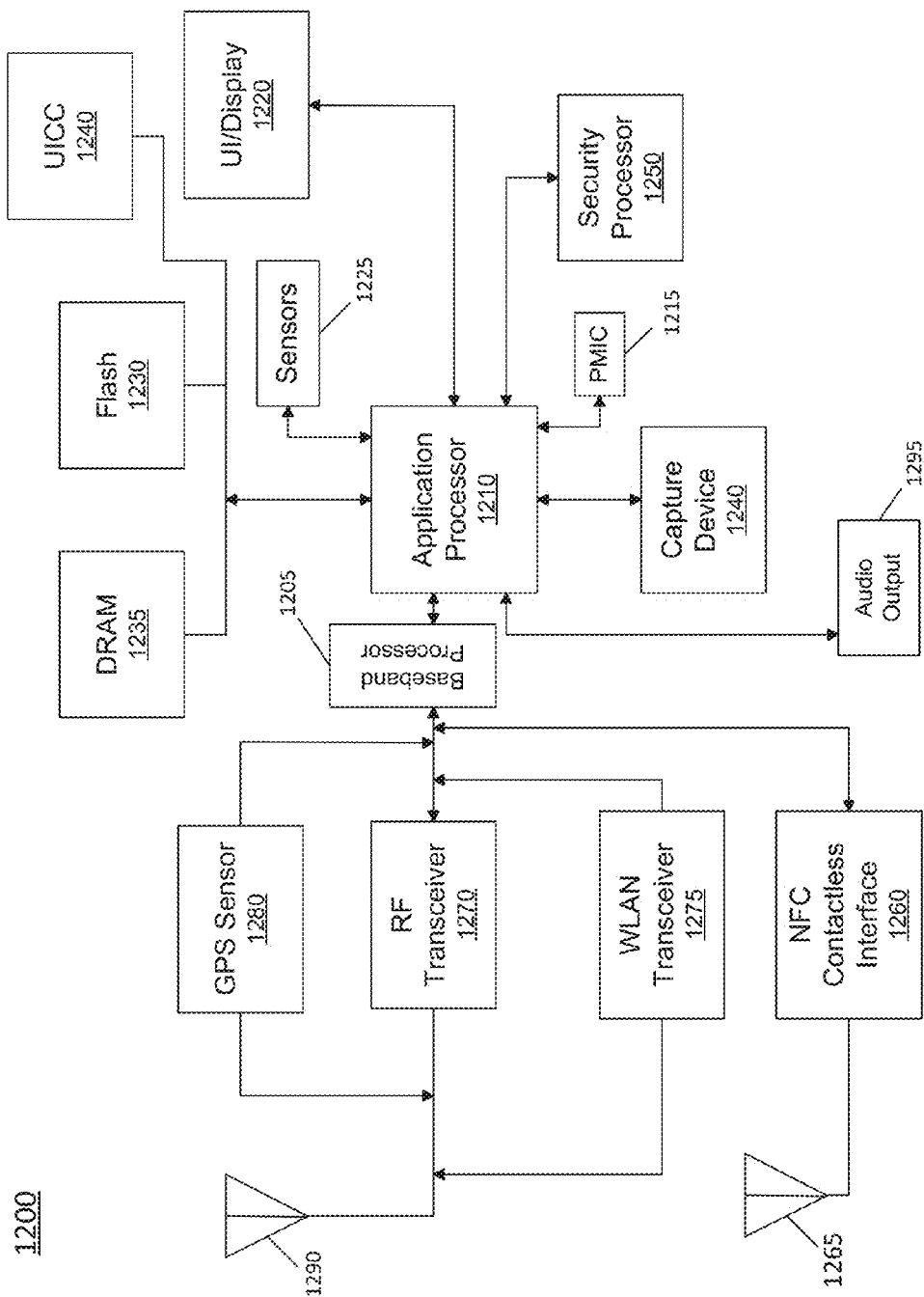
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device. As described herein, application processor 1210 may include a plurality of cores, where these cores can be dynamically mapped to different logical identifiers to effect transparent thread migrations.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
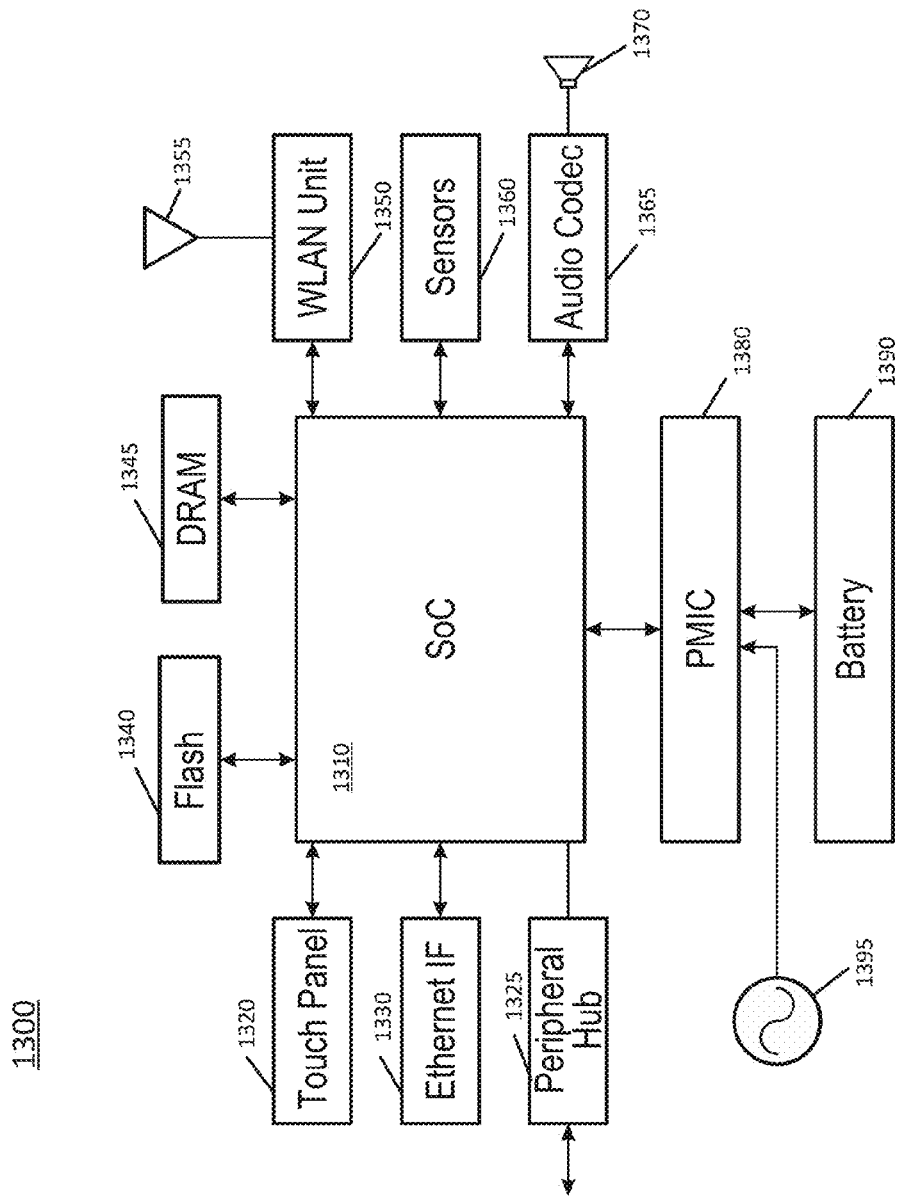
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
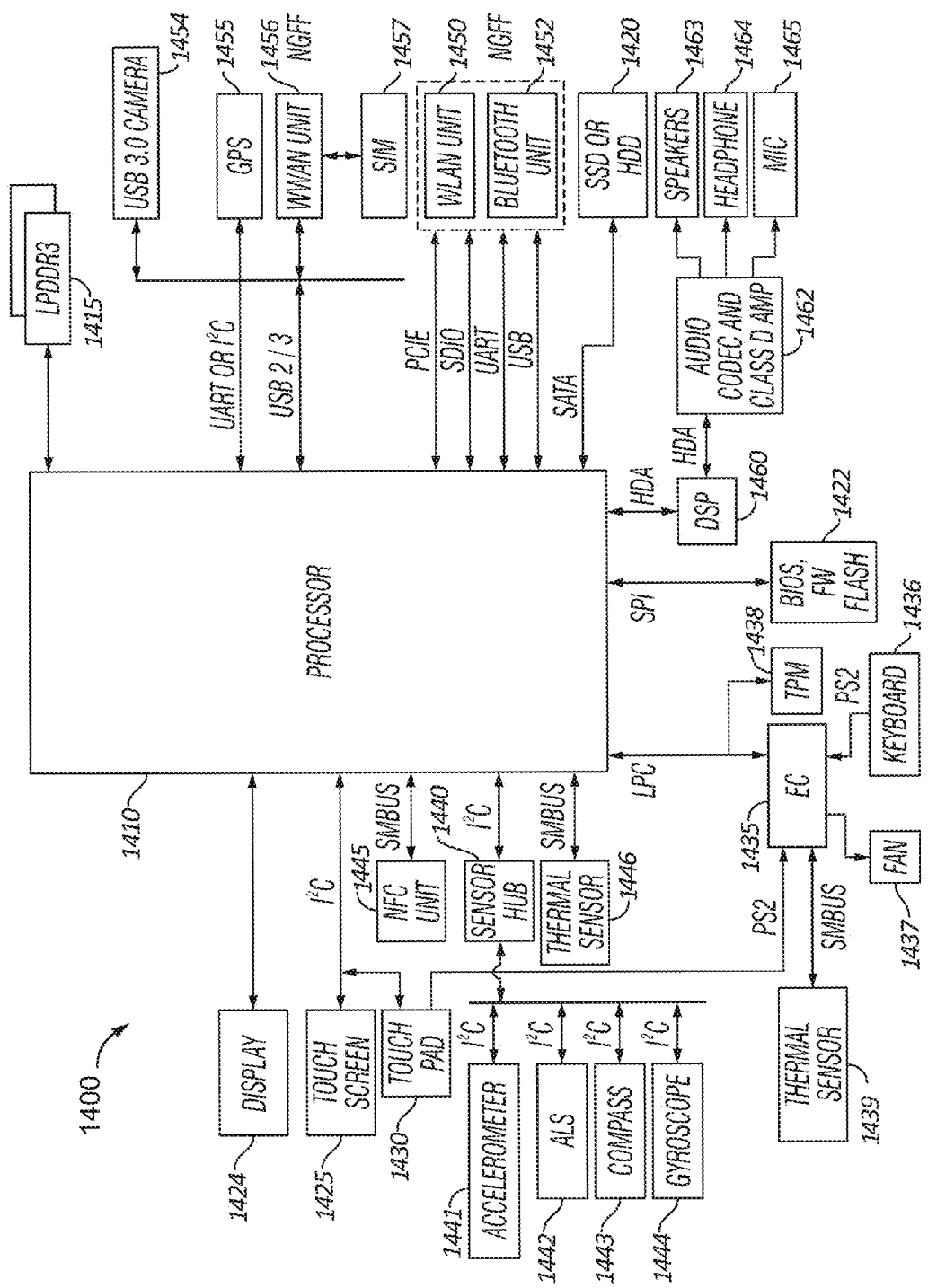
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
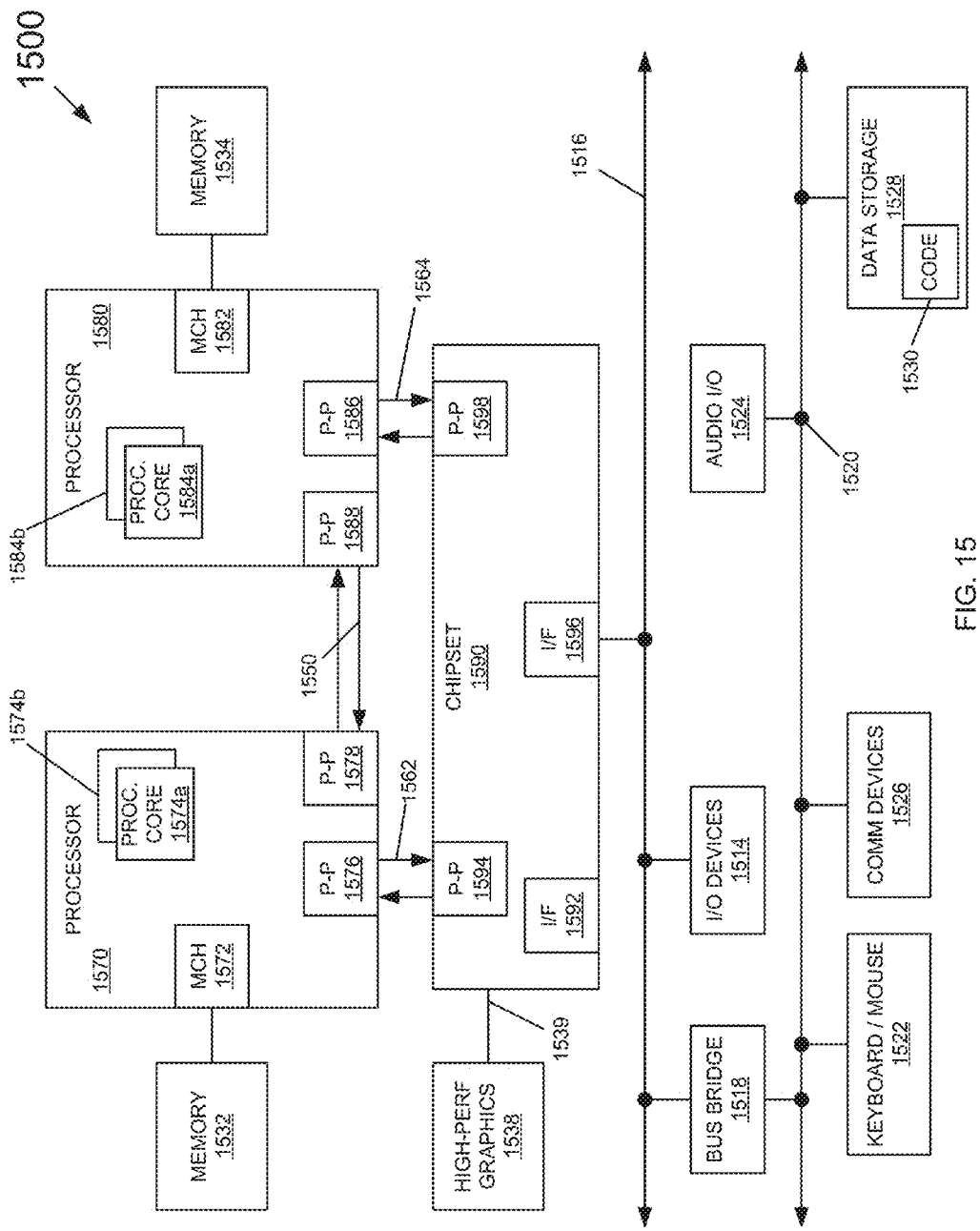
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. As shown in FIG. 15, first processor 1570 and second processor 1575 may include corresponding PCUs 1575 and 1585, which may be configured to perform various power management operations as described herein, including the dynamic core logical identifier remapping to effect transparent thread migrations for a variety of power and performance reasons. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
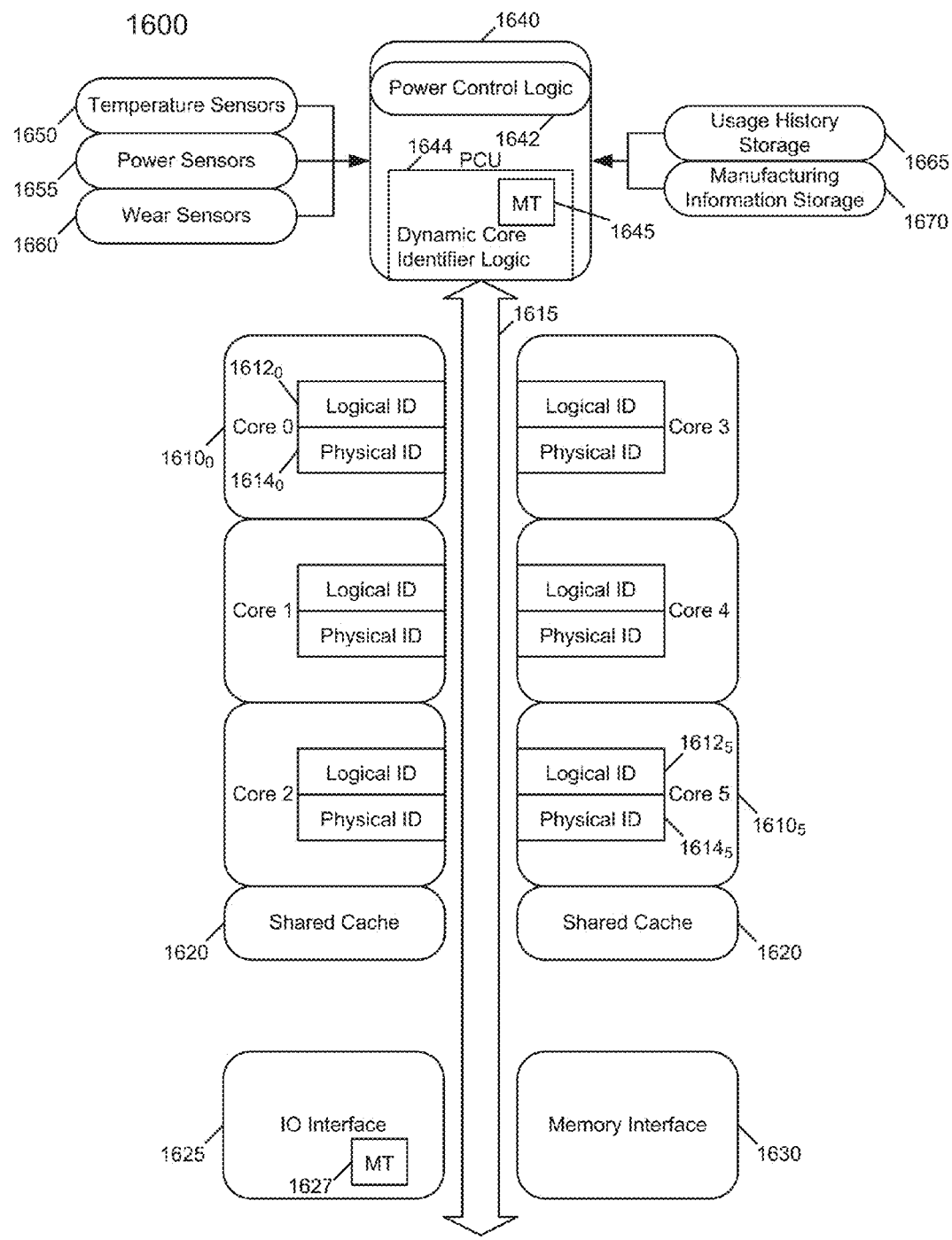
FIG. 16 is a block diagram of a processor in accordance with an embodiment of the present invention.

Referring now to FIG. 16, shown is a block diagram of a processor in accordance with an embodiment of the present invention. As shown in FIG. 16, processor 1600 is a multicore processor including a plurality of cores $1610_0$-$1610_5$. Although shown in this example with six cores, understand the scope of the present invention is not so limited, and a multicore processor may include any number of processor cores desired for a particular design.

With relevance to the dynamic logical identifier mapping described herein, each core includes a logical ID storage $1612_0$-$1612_5$ and a physical ID storage $1614_0$-$1614_5$. In an embodiment, a logical ID stored in logical ID storage 1612 may be dynamically updated as described herein. Instead, a physical ID stored in physical ID storage 1614 may be fixed or static. In some cases, physical ID storage 1614 may be implemented as a non-volatile storage, fuse storage or other fixed storage, while instead logical ID storage 1612 may be implemented as a volatile storage, such as a register, e.g., a configuration register to be dynamically updated as described herein.

Still with reference to FIG. 16, processor 1600 further includes a shared cache memory 1620, which in an embodiment may be implemented as one or more levels of a cache hierarchy, such as a level 2 (L2) and/or a level 3 (L3) cache, coupled to the various cores via an interconnect 1615, which in an embodiment may be a ring-based interconnect. Understand of course that lower levels of such cache memory hierarchy may be present in each individual core. For example, each core 1610 may include at least a first level (L1) cache.

As further shown in FIG. 16, an input/output (I/O) interface 1625 further couples to the cores via interconnect 1615 along with a memory interface 1630, which in turn may couple to a system memory coupled to processor 1600 (not shown in FIG. 16). In some cases, memory interface 1630 may include an integrated memory controller to control memory operations with the coupled memory. I/O interface 1627 in turn may act as an interface between processor 1600 and one or more peripheral devices such as I/O devices. To enable interaction between particular cores 1610 and such devices, e.g., for purposes of handling incoming interrupts via an internal interrupt controller of I/O interface 1625, I/O interface 1625 may include a mapping table 1627 that includes mappings between logical IDs and physical IDs for the cores, such that incoming requests and/or responses can be directed to the appropriate core. Update of this mapping table may occur as described herein.

As further shown in FIG. 16, processor 1600 includes a power control unit (PCU) 1640. In different embodiments, PCU 1640 may be implemented as a combination of hardware, software, and/or firmware. As an example, PCU 1640 may be implemented as one or more microcontrollers and/or hard coded logic. In some cases, PCU 1640 may be implemented as another core of processor 1600 (e.g., a low power core). In general, PCU 1640 may be configured to control power management operations with regard to processor 1600, such that cores 1610 and other circuitry of the processor (generally referred to as uncore circuitry) may be dynamically controlled to operate at different power consumption levels and in different performance states while in an active power state. To this end, PCU 1640 includes power control logic 1642 that may be configured to perform power management operations, such as enabling particular cores 1610 to enter into and exit from one or more low power states as appropriate for a given workload being executed on processor 1600.

For purposes of performing transparent core scheduling and migration operations as described herein, PCU 1640 may further include dynamic core identifier logic 1644. In general, dynamic core identifier logic 1644 may determine that a given workload should be migrated to or from one or more cores 1610, based on a variety of conditions. To effect such migration in a manner transparent to system software such as an OS, identifier logic 1644 may include a mapping table 1645. Mapping table 1645 may have a plurality of entries, each to associate a logical ID with a physical ID for a given core. As such, by appropriate remapping of one or more entries of mapping table 1645, identifier logic 1644 may operate to transparently and dynamically migrate workloads between cores.

In various embodiments, dynamic core identifier logic 1644 can dynamically reprogram the logical ID (but not physical ID) for any core at runtime, subject to the constraint that a 1:1 mapping between core, physical ID and logical ID exists at all times. Stated another way, regardless of power state of a given core, there is always a physical ID and a logical ID associated with the core (even where the core is not aware of the logical mapping due to presence in a low power state). Depending upon processor implementation, cores that have their dynamic logical ID mapping affected may be stopped or otherwise placed in a suitable low power or sleep state while logical ID is changed.

PCU 1640 may execute hardware or embedded firmware algorithms to collect data from multiple sensors and make determinations regarding an optimal logical/physical mapping, and the appropriate time to trigger such remapping. Note that in some implementations lacking a dedicated PCU (such as low-power embedded systems), this functionality may be implemented in software such as appropriate system software to execute on a given core or other functional unit of the processor. Wear measurements may be used to indicate silicon aging with use. Usage history may indicate, for example, time durations as to how long cores have been in various C-states (or P-states). In turn, manufacturing information may include stored information such as voltage-frequency curves, available frequencies, leakage power and other manufacturing characterization data.

Thus to obtain information for use in migration determinations, a variety of incoming data and other source information may be received in PCU 1640. As illustrated, a plurality of temperature sensors 1650 may be coupled to PCU 1640 to provide temperature and/or other thermal information regarding thermal conditions present at various locations within a processor. In some cases one or more temperature sensors 1650 may be included in and/or otherwise associated with each core 1610. In other cases, one or more temperature sensors 1650 may be included and/or associated with a particular geographic region of processor 1600. Similarly, a plurality of power sensors 1665 may be coupled to PCU 1640 to provide power consumption information regarding an actual amount of power being consumed in various components (e.g., cores) of a processor. In some cases one or more power sensors 1665 may be included in and/or otherwise associated with each core 1610, while in other cases, such sensors may be included and/or associated with particular geographic regions of processor 1600. Of course other environmental information associated with processor operation also may be maintained and provided to PCU 1640, such as information regarding operating parameters (e.g., voltage and/or frequency) of the cores or other logic of the processor.

Still further, a plurality of wear sensors 1660 may be present to provide wear information regarding cores 1610. In different embodiments, wear information may include one or more of the following: an indirect measurement of wear such as a ring oscillator having frequency (at a constant voltage) that, e.g., decreases with stress and wear. Other examples may include information stored in a non-volatile storage that tracks time spent in various power/performance states, and/or temperatures, which provides a direct measurement of stress or wear on the processor. In addition, usage history storage 1665 may provide usage information to PCU 1640. In an embodiment, each core may be associated with one or more entries in usage history storage 1665 to store information regarding a history of usage of the core in particular activity states (e.g., an active state such as a C0 state) and/or one or more low power states. Still further in some cases it is possible to provide usage history information as to particular performance states at which a core has been operated. In addition, manufacturing information storage 1670 may store various information obtained during manufacture and/or characterization operations with regard to processor 1600. For example, manufacturing information storage 1670 may be configured to store voltage-frequency curves, available operating frequencies, leakage power and/ or other manufacturing characterization data.

That is, it is recognized that due to manufacturing variations, each core 1610 may have different characteristics, e.g., with regard to power consumption, operating capabilities and so forth, and PCU 1640 (and more specifically identifier logic 1644) may take such information into account in determining whether to dynamically and transparently migrate one or more workloads between cores. In an embodiment, manufacturing information storage 1670 may include a plurality of entries each associated with a core or other functional unit of processor 1600. In such embodiment, each entry may include a plurality of characteristic values for the corresponding core/unit, e.g., as determined during manufacturing test operations, and which can vary over such cores/units of a given processor due to manufacturing variations. Such characterization values may include operating parameters such as a maximum operating voltage and frequency (such as a given turbo mode frequency), a leakage power value, among other such values for the given core/unit (and which may vary for each unit). Other characterization values may include dynamic capacitance and temperature sensitivity. Understand while shown at this high level in the embodiment of FIG. 16, many variations and alternatives are possible.

Embodiments may be used to perform a dynamic remapping to enable the processor to be updated from one logical/ physical mapping to another, while maintaining functionality. One implementation of such a flow is as follows: a PCU (including constituent logic) determines to trigger a remapping flow based on available data. A signal to start a remapping flow is sent to the relevant cores. One or more cores may stop issuing new instructions and wait for issued instructions to complete, while new instructions are issued to memory and pending reads to a shared cache memory 1620 are completed. In turn, pending reads in memory may complete and data is sent back to the cores.

Note that in some cases, this operation of waiting for completion of memory reads may be omitted, and a memory controller can be used to buffer read data until the remapping is complete, where the memory interface maintains a logical/ physical core mapping to send data to the correct logical core after read completion. Note that shared cache memory 1620 may be used for data storage. I/O interface 1625 may pause accepting new requests (at least for the cores to undergo dynamic remapping). At this point, the PCU may force the cores to enter a low power non-active state (such as a C6-state in which caches and architectural state are flushed, e.g., to shared cache memory 1620). At this point the processor is quiesced and ready for a remapping, in which the PCU writes a new logical ID to one or more cores based on the new mapping, and also updates the logical/ physical mapping in IO interface 1625. From this point forward, any incoming IO requests and interrupts will be routed to the correct new physical core.

Figure 17:
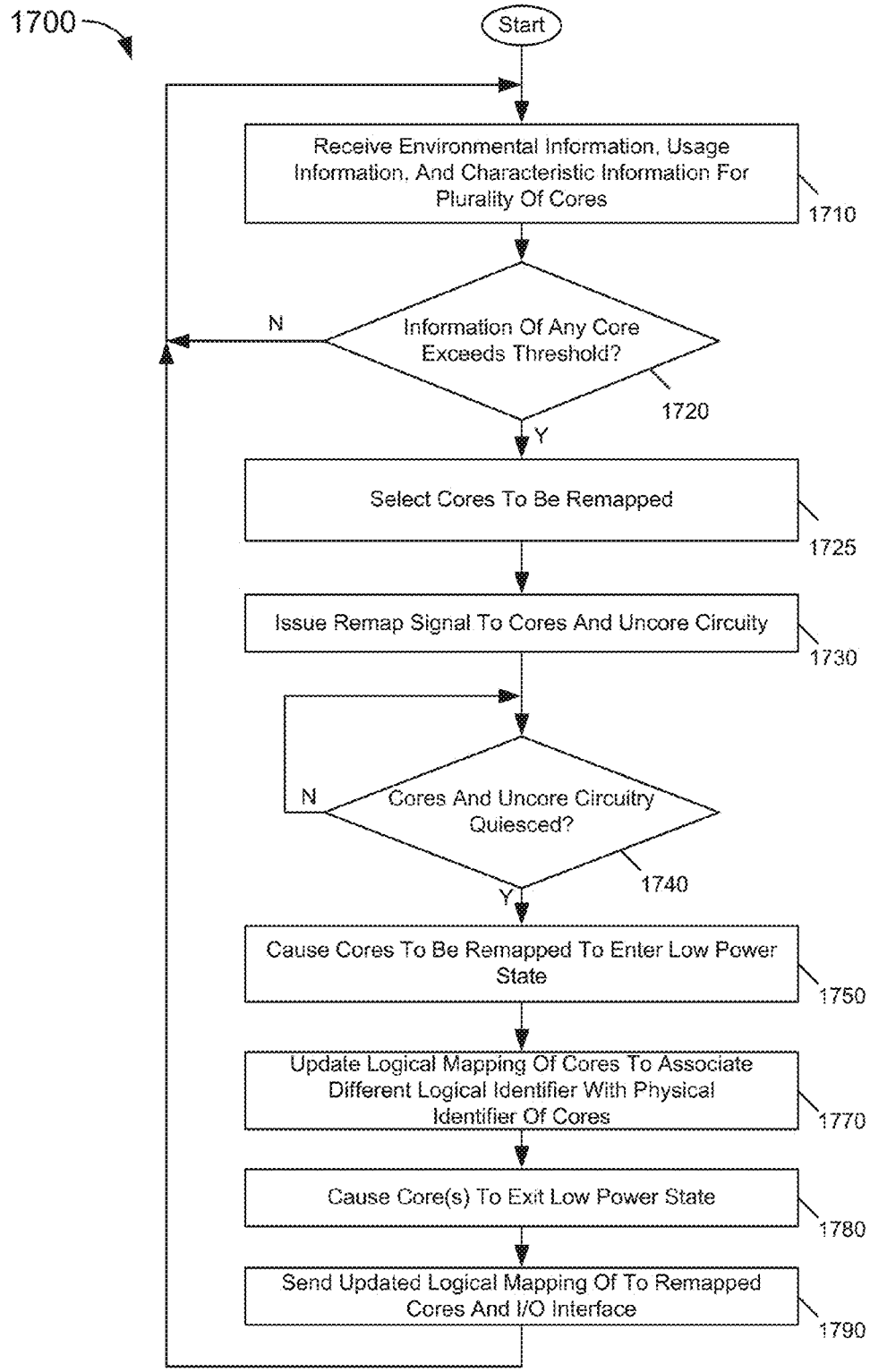
FIG. 17 is a flow diagram of a method in accordance with an embodiment of the present invention.

Referring now to FIG. 17, shown is a flow diagram of a method in accordance with an embodiment of the present invention. As shown in FIG. 17, method 1700 may be performed by appropriate combinations of hardware, software, and/or firmware, such as of a power control unit of a processor.

As seen, method 1700 begins by receiving a variety of different information in the PCU. In the example shown, at block 1710, environmental information, usage information, and characteristic information may be received for the various cores and other dedicated processing logic such as one or more graphics units or other specialized function units of a multicore processor. In general, the environmental information may correspond to thermal information, power consumption information, and operating parameter information, such as voltage and/or frequency. In turn, the usage information may correspond to a history-based usage of the core, and the characteristic information may correspond to predetermined operating characteristic information for particular cores, e.g., as determined at manufacture.

Next at diamond 1720 it is determined based on this information whether one or more thresholds of a given core have been exceeded. For example, the information may indicate that a particular thermal threshold is reached, a power consumption level is reached or so forth. If so, control passes to block 1725 where one or more cores to be remapped may be selected. Of course understand that the remapping decision may occur at other locations in the process. In an embodiment, this selection may be based on information in one or more tables, such as a characteristics table (e.g., in manufacturing information storage 1670 of FIG. 16) to determine an appropriate core to which a workload can be dynamically migrated in a transparent manner. For purposes of discussion herein, assume that the determination is such that a single core exceeds a given threshold, such as a thermal threshold. Further at the same time, assume that one or more cores of the processor are in a low power state to realize efficient migration. That is, while in certain cases an active workload being executed on one active core can be dynamically migrated to another active core via an update to logical ID mappings, in certain implementations the OS-transparent dynamic core migration effected via logical ID remapping may be performed in situations where at least one idle core is available to receive a migrated workload.

Next control passes to block 1730 where a remap signal may be issued to relevant cores and the uncore circuitry. Understand while this remap signal may be sent only to the particular cores to have their logical IDs remapped, in other cases a remap signal may be sent to all cores. Furthermore, in certain situations such as when a core to which a workload is to be dynamically migrated is currently in a low power state, this remap signal may not be sent to the core, as instead the remap signal is issued primarily for purposes of preparing the core for entry into a low power state to effect the logical ID remapping. Thus such signal may be used as a trigger to cause such cores and other circuitry to begin operations to enter into an appropriate low power state to enable the dynamic remapping to occur. Next, it is determined whether the cores and uncore circuitry have been quiesced (diamond 1740). For example, when the selected cores and other circuitry have completed pending operations and halted issuance of further operations, they may send a quiesce or acknowledgement signal to indicate this state. At block 1750 the cores are caused to enter into a low power state, e.g., a given C-state. As part of the low power state entry, the context information of the workload may be stored to a given destination such as a shared cache memory.

To effect such dynamic migration, first a logical mapping for the new core may be updated. More specifically, at block 1770 the logical mapping for this new core may be updated to associate a new logical identifier with a physical identifier of the core. Such change may be effected in one or more mapping tables. For example, the PCU may include a primary mapping table to associate logical IDs with physical IDs. In the example described herein, the logical ID associated with the core on which the workload to be migrated was being executed can now be associated with the previously idle core that is the destination of this thread migration. And similarly, the logical ID for the previously idle core can be dynamically remapped to the previously active core on which the thread was being executed.

Of course, in other examples, more than two cores may be involved in a migration scenario and appropriate remapping of the logical identifiers may occur. In any case, a 1:1 mapping of the logical IDs to physical IDs of all available cores of a processor may be maintained. Note that this 1:1 mapping may be for all cores that are visible to the OS and other system software. That is, in some processors it is possible for one or more cores to be maintained hidden from the OS and other system software as spare cores to be dynamically used later during processor lifetime, such as upon a determination that one or more other cores have failed and thus are dynamically removed from service. This invisibility to the OS also may be the case for processors with heterogeneous cores that remain hidden from the OS. In the case of heterogeneous cores, workload may be used, e.g., by the PCU, to determine that the work may be better suited for a different type of core (when there are heterogeneous cores). Note also that cores may appear the same to software but have different performance/power characteristics that are over and above manufacturing differences (e.g., smaller lower performance but power efficient cores versus bigger higher performance and less power efficient cores).

Still with reference to FIG. 17, thereafter control passes to block 1780 where the cores may be caused to exit the low power state. Control next passes to block 1790 where the updated logical mapping may be sent to the cores and the I/O interface. The receiving core may update its logical identifier stored in its logical ID storage to the new logical ID to effect the updated logical mapping. Note that for a core to remain in a low power state as a result of the logical remapping, this updated mapping is not sent to the core, as it remains in the low power state. Instead, when the core is to exit from the low power state at a later time, the current logical ID mapping for that core may be provided to that core. Understand that during the time that a given core is in a low power state, it may have had multiple logical IDs associated with it by way of this dynamic logical ID remapping. Further, since the core is in a low power state, it is not made aware of any of these logical ID remappings, and instead upon waking from a low power state, it is informed only of the current logical ID mapping.

Still with reference to FIG. 17, at this point normal operation of the processor may continue, and a workload previously being executed on a first core may now be executed on a second core due to this update to logical ID mapping. As such, the new core may obtain a context state of the thread from its storage location (e.g., the shared cache memory) by way of its updated logical ID mapping. Understand while shown at this high level in the embodiment of FIG. 17, many variations and alternatives are possible. For example, it is possible for a given core (or other entity, including the PCU itself) that receives a dynamic remap signal and thus is requested to enter into a low power state, to prevent such operations from occurring at that time by way of an abort flow. For example, with reference back to FIG. 17, if an interrupt directed to a core is received (e.g., by an interrupt controller of the processor) during the flow of method 1700 and the requested handling time for the interrupt is prior to the completion of a dynamic logical ID remapping and/or based on priority of the interrupt, it is possible for the flow of method 1700 to be aborted prior to completion of the logical ID remapping, such that the core does not enter into the low power state (or exits the low power state if already present therein) without having a dynamic logical ID remapping performed to enable the core to handle the interrupt. As such, in this case the PCU does not cause the core to enter into the low power state or update logical IDs. Understand that at the completion of such interrupt handling, the logical ID remapping may again be initiated, in some cases.

Figure 18:
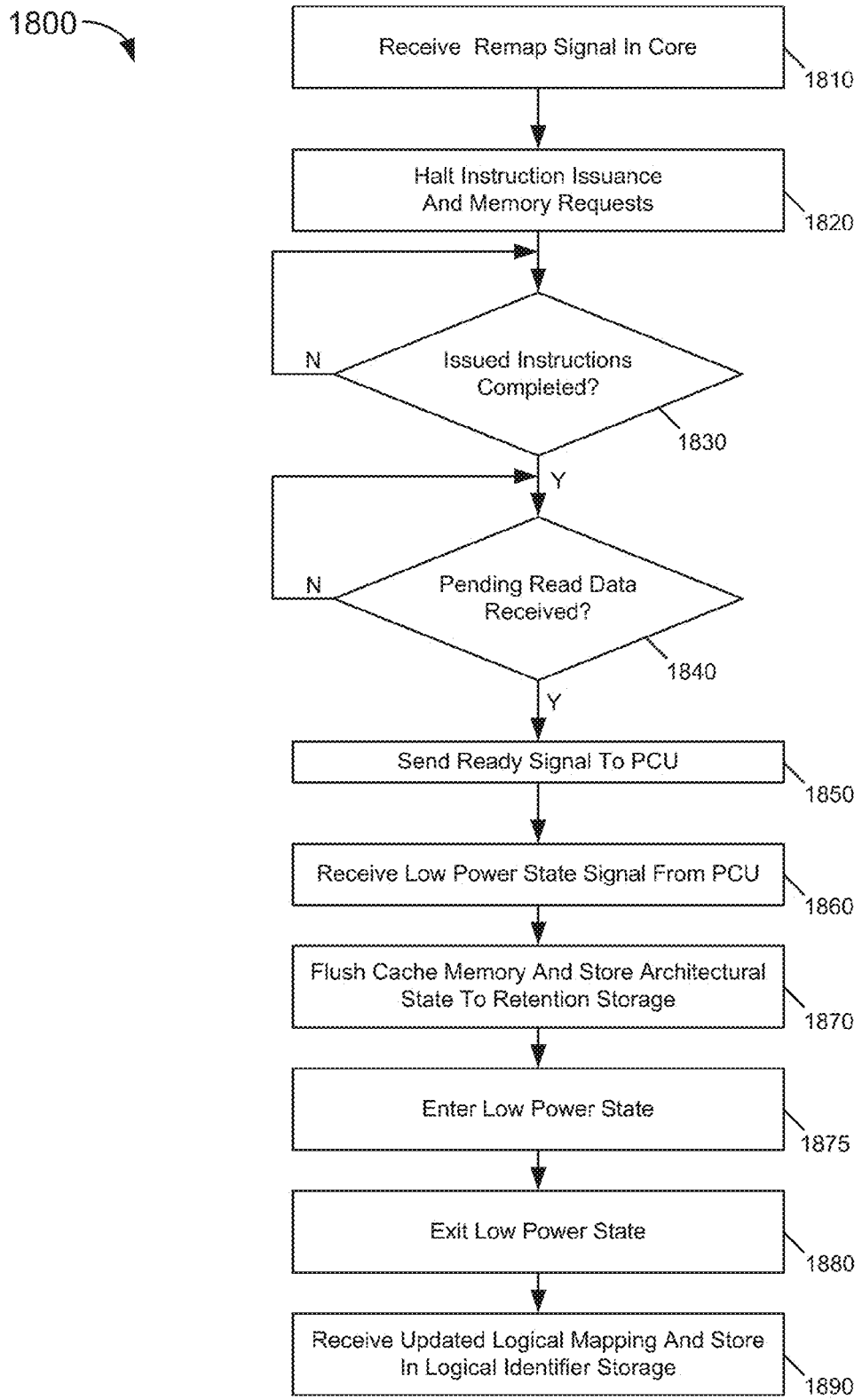
FIG. 18 is a flow diagram of a method for controlling a core during a logical remapping operation as described herein

Referring now to FIG. 18, shown is a flow diagram of a method for controlling a core during a logical remapping operation as described herein. Method 1800 is from the view of a core that is currently active and is to have its logical ID remapping updated. As one such example, this logical ID remapping may be effected to cause one or more threads being executed on this core to be migrated to an idle core to enable a thermal condition on the current core to be resolved, but of course other example scenarios are possible. As shown in FIG. 18, method 1800 may begin receiving a remap signal in a core (block 1810). Responsive to receipt of this signal, the core may halt instruction issuance and issuance of further memory requests (block 1820). Next it is determined whether all issued instructions have been completed (diamond 1830). In addition, it is determined whether all pending read data has been received (diamond 1840). Note that while shown with this particular sequence, these determinations as to pendency of such operations may occur in different orders and time manners. In other cases, rather than waiting for completion of all issued instructions and/or receipt of all pending read data, it is possible for a processor to abort or shoot down one or more instructions in flight, rather than effect their completion. Still further, while any write requests to data that write dirty data to the memory are to be completed, it is possible for pending read data requests to be aborted without waiting for their completion.

Still with reference to FIG. 18, when any pending operations have completed (e.g., issued instructions, returns from memory and so forth), a ready signal may be sent to the PCU (block 1850). Thereafter, a low power state signal is received from the PCU (block 1860). Responsive to this signal, the core may be directed to enter a particular low power state, such as a C-state. To this end, to enable entry into the given state, various information including thread context and architectural state of the core may be stored to a retention storage (block 1870). Depending upon processor implementation, this retention storage may be within the core itself (where the retention storage is maintained at least at a retention voltage in which the information in the storage is maintained during the low power state), or the information can be flushed to another portion of a cache hierarchy such as a shared cache memory where the information is maintained in the given low power state. In any case, control next passes to block 1875, where the core enters the low power state. Understand that during this core low power state, dynamic update to one or more mapping tables may be effected, as described herein. Next at block 1880, the core may exit the low power state. Thereafter at block 1890, an updated logical mapping may be received and stored in the logical identification storage. This updated mapping may thus provide a new logical ID for the core. And similarly, the previous logical ID associated with this core may be provided to another core, to enable that core to continue execution of a given workload previously executed on the remapped core.

Understand also that this exit from the low power state may occur at a later time such as when a core that was previously at a temperature above a thermal threshold has cooled sufficiently to be below one or more thermal thresholds and thus available to execute a new workload. As such, this updated logical mapping provided at block 1890 may occur when the core exits from a low power state and is to receive one or more threads for execution, which may be different threads than previously executed on the core prior to its entry into the low power state and its logical ID remapping. Also, understand that while this core remains in a low power state, its logical ID mapping may be updated one or more times without the knowledge of the core. Instead upon awaking, it is provided with the current logical ID mapping for the core. Thereafter, the core may perform appropriate operations to again perform operations of a given workload. While shown at this high level in the embodiment of FIG. 18, many variations and alternatives are possible.

Note that various use cases or scenarios may trigger a dynamic remapping as described herein.

As one example, a high priority thread running on a single core may be migrated to a faster core having a higher opportunistic turbo mode frequency (as determined with reference to manufacturing information). As another example, when a subset of cores is active (less than all cores), one or more high power cores (as determined with reference to manufacturing information) may be preferentially selected to be placed in an inactive state, and any running threads on such cores may be migrated to one or more lower power cores.

Yet another use case may occur where one core (or a subset of cores) has significantly higher use time or observed wear as compared to other cores. In such instances, threads running on those cores may be migrated to other cores as a wear-leveling countermeasure. In some embodiments, dynamic remapping may be periodically performed according to a predetermined interval (e.g., approximately every few hours) so that threads can be assigned to logical IDs in a random (or at least pseudo-random) manner to ensure that adequate wear leveling occurs such that all available cores are selected to execute workloads, rather than always allocating threads to particular cores (such as higher performing cores or lower power consuming cores).

A still further use case may occur where a high junction temperature is observed in a given region of the processor because all active cores are physically located in close physical relation to each other (e.g., within a same physical region of the processor). In such cases, running threads may be migrated to physically more distant cores to reduce power density and peak temperature.

Thus in different embodiments, the decision on whether or not to trigger remapping can be implemented in multiple manners (or a combination thereof). Specifically, remapping can occur periodically, e.g., according to a predetermined periodic interval. In other cases, remapping can occur based on activity and/or at idle periods. In yet other cases, remapping can be reward based, where remapping is triggered when a calculated performance benefit exceeds a threshold level. Embodiments thus may be used to improve power, performance, thermal or reliability characteristics of a processor.

The following examples pertain to further embodiments.

In one example, a processor comprises: a plurality of cores, each of the plurality of cores including a first storage to store a physical identifier for the core and a second storage to store a logical identifier associated with the core; a plurality of thermal sensors to measure a temperature at a corresponding location of the processor; and a power controller including a dynamic core identifier logic to dynamically remap a first logical identifier associated with a first core to associate the first logical identifier with a second core, based at least in part on a temperature associated with the first core, the dynamic remapping to cause a first thread to be migrated from the first core to the second core transparently to an operating system.

In an example, the dynamic core identifier logic is to dynamically remap the first logical identifier based on at least one of a usage history and aging information of the first core.

In an example, the dynamic core identifier logic is to dynamically remap the first logical identifier based on a power consumption level of the first core.

In an example, the processor of one or more of the above examples further includes a mapping table including a plurality of entries each to store a logical identifier-to-physical identifier association. The dynamic core identifier logic may update an entry of the mapping table associated with the second core responsive to the dynamic remapping of the first logical identifier to the second core to store the first logical identifier in the entry associated with the second core.

In an example, the processor of one or more of the above examples further comprises an I/O interface coupled to the plurality of cores, where the I/O interface is associated with a second mapping table including a plurality of entries each to store a logical identifier-to-physical identifier association, and the dynamic core identifier logic is to communicate the update to the entry of the mapping table to the I/O interface to enable the second mapping table to be updated.

In an example, the dynamic core identifier logic is to provide the first logical identifier to the second core to enable the second core to store the first logical identifier in the second storage of the second core.

In an example, the second core is to thereafter obtain a context of the first thread from a retention storage and continue execution of the first thread.

In an example, each of the physical identifiers for each of the plurality of cores is unique and static.

In an example, the dynamic core identifier logic is to dynamically remap the first logical identifier to migrate the first thread from the first core to the second core when the first core has a higher power consumption level than the second core and a subset of the plurality of cores are active, the first core to be placed in an inactive state after the dynamic remap.

In an example, the dynamic core identifier logic is to dynamically remap the first logical identifier to migrate the first thread from the first core to the second core when the second core is to operate at a higher turbo mode frequency than the first core, where the first thread comprises a high priority thread to execute on a single core.

In an example, the dynamic core identifier logic is to dynamically remap the first logical identifier to migrate the first thread from the first core to the second core when temperature information associated with a first region including the first core exceeds a threshold, and temperature information associated with a second region including the second core is less than the threshold.

Note that the above processor can be implemented using various means.

In an example, the processor comprises a SoC incorporated in a user equipment touch-enabled device.

In another example, a system comprises a display and a memory, and includes the processor of one or more of the above examples.

In another example a method comprises: receiving, in a first logic of a processor, environmental information regarding operation of the processor, usage information for a plurality of cores of the processor, and characteristic information for the plurality of cores; selecting a first core on which one or more threads are executed to be dynamically remapped from association with a first logical identifier to association with a second logical identifier based on at least some of the environmental information, the usage information, and the characteristic information; and causing the first core to enter into a low power state, and associating the second logical identifier with the first core, to cause the one or more threads to be dynamically migrated to a second core to be associated with the first logical identifier.

In an example, the method further comprises issuing a remap signal to the first core and at least a portion of uncore circuitry of the processor, to cause the first core and at least the portion of the uncore circuitry to be quiesced, prior to causing the first core to enter into the low power state.

In an example, the method further comprises: receiving an abort signal from the first core; and responsive to the abort signal, preventing the first core from entering into the low power state and not associating the second logical identifier with the first core.

In an example, the method further comprises causing the second core to exit a low power state and providing the first logical identifier to the second core for storage in a logical identifier storage of the second core.

In an example, the method further comprises, after the first logical identifier is stored in the logical identifier storage of the second core, accessing context information of the one or more threads from a shared cache memory, and resuming execution of the one or more threads on the second core.

In an example, the method further comprises: selecting the first core when power characteristic information associated with the first core is higher than power characteristic information associated with the second core and a subset of the plurality of cores are active; and causing the first core to enter a low power state after the dynamic remap.

In an example, the method further comprises selecting the first core when the second core is to operate at a higher turbo mode frequency than the first core, where the one or more threads comprise high priority threads.

In an example, the method further comprises selecting the first core when a temperature of the first core exceeds a thermal threshold, and a temperature of the second core is less than the thermal threshold.

In an example, the method further comprises selecting the first core after a threshold time, to enable wear leveling of the plurality of cores.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In a still further example, a system comprises a processor having: a plurality of cores, each including a first storage to store a physical identifier for the core and a second storage to store a logical identifier associated with the core; a power controller to dynamically remap a first logical identifier from association with a first core to association with a second core while the first core and the second core are in a low power state, to cause a first thread to be migrated from the first core to the second core transparently to an operating system; a first mapping table including a plurality of entries each to store a logical identifier-to-physical identifier association for a core; an I/O interface to couple to one or more devices and to provide an incoming message to a selected core; and a second mapping table coupled to the I/O interface including a second plurality of entries each to store a logical identifier-to-physical identifier association for a core, where the power controller is to dynamically update a first entry of the first mapping table to associate the first logical identifier with the second core and to cause a dynamic update to a corresponding entry of the second mapping table to associate the first logical identifier with the second core. The system may further include a DRAM coupled to the processor.

In an example, the processor comprises a storage to store a plurality of entries each associated with a core and including a plurality of characterization values for the core, where at least some of the plurality of cores have a different characterization value for a first operating parameter, based on manufacturing variation.

In an example, the power controller is to cause the second core to exit the low power state and thereafter provide the first logical identifier to the second core for storage in the second storage of the second core.

In an example, the second core is to access context information of the first thread from a shared cache memory and resume execution of the first thread, based at least in part on the first logical identifier.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores, each of the plurality of cores including a first storage to store a physical identifier for the core and a second storage separate from the first storage to store a logical identifier associated with the core;
   a plurality of thermal sensors to measure a temperature at a corresponding location of the processor;
   a power controller including a dynamic core identifier logic to dynamically remap a first logical identifier associated with a first core to associate the first logical identifier with a second core, based at least in part on a temperature associated with the first core, the dynamic remapping to cause a first thread in execution on the first core to be migrated from the first core to the second core transparently to an operating system;
   a mapping table including a plurality of entries each to store a logical identifier-to-physical identifier association, wherein the dynamic core identifier logic is to update an entry of the mapping table associated with the second core responsive to the dynamic remapping of the first logical identifier to the second core to store the first logical identifier in the entry associated with the second core; and
   an input/output (I/O) interface coupled to the plurality of cores, wherein the I/O interface is associated with a second mapping table including a plurality of entries each to store a logical identifier-to-physical identifier association, wherein the dynamic core identifier logic is to communicate the update to the entry of the mapping table to the I/O interface to enable the second mapping table to be updated.

2. The processor of claim 1, wherein the dynamic core identifier logic is to dynamically remap the first logical identifier based on at least one of a usage history and aging information of the first core.

3. The processor of claim 2, wherein the dynamic core identifier logic is to dynamically remap the first logical identifier based on a power consumption level of the first core.

4. The processor of claim 1, wherein the dynamic core identifier logic is to provide the first logical identifier to the second core to enable the second core to store the first logical identifier in the second storage of the second core.

5. The processor of claim 4, wherein the second core is to thereafter obtain a context of the first thread from a retention storage and continue execution of the first thread.

6. The processor of claim 1, wherein each of the physical identifiers for each of the plurality of cores is unique and static.

7. The processor of claim 1, wherein the dynamic core identifier logic is to dynamically remap the first logical identifier to migrate the first thread from the first core to the second core when the first core has a higher power consumption level than the second core and a subset of the plurality of cores are active, the first core to be placed in an inactive state after the dynamic remap.

8. The processor of claim 1, wherein the dynamic core identifier logic is to dynamically remap the first logical identifier to migrate the first thread from the first core to the second core when the second core is to operate at a higher turbo mode frequency than the first core, wherein the first thread comprises a high priority thread to execute on a single core.

9. The processor of claim 1, wherein the dynamic core identifier logic is to dynamically remap the first logical identifier to migrate the first thread from the first core to the second core when temperature information associated with a first region including the first core exceeds a threshold, and temperature information associated with a second region including the second core is less than the threshold.

10. A system comprising:
a processor having:
   a plurality of cores, each of the plurality of cores including a first storage to store a physical identifier for the core and a second storage to store a logical identifier associated with the core;
   a power controller, based at least in part on a temperature associated with a first core, to dynamically remap a first logical identifier from association with the first core to association with a second core while the first core and the second core are in a low power state, to cause a first thread in execution on the first core to be migrated from the first core to the second core transparently to an operating system;
   a first mapping table including a plurality of entries each to store a logical identifier-to-physical identifier association for a core;
   an input/output (I/O) interface to couple to one or more devices and to provide an incoming message to a selected core; and
   a second mapping table coupled to the I/O interface including a second plurality of entries each to store a logical identifier-to-physical identifier association for a core, wherein the power controller is to dynamically update a first entry of the first mapping table to associate the first logical identifier with the second core and to cause a dynamic update to a corresponding entry of the second mapping table to associate the first logical identifier with the second core; and a
dynamic random access memory (DRAM) coupled to the processor.

11. The system of claim 10, wherein the processor comprises a storage to store a plurality of entries each associated with a core and including a plurality of characterization values for the core, wherein at least some of the plurality of cores have a different characterization value for a first operating parameter, based on manufacturing variation.

12. The system of claim 10, wherein the power controller is to cause the second core to exit the low power state and thereafter provide the first logical identifier to the second core for storage in the second storage of the second core.

13. The system of claim 12, wherein the second core is to access context information of the first thread from a shared cache memory and resume execution of the first thread, based at least in part on the first logical identifier.

* * * * *